United States Patent
Ikeuchi et al.

(10) Patent No.: US 11,270,717 B2
(45) Date of Patent: Mar. 8, 2022

(54) NOISE REDUCTION IN ROBOT HUMAN COMMUNICATION

(71) Applicant: Microsoft Technology Licensing, LLC, Redmond, WA (US)

(72) Inventors: Katsushi Ikeuchi, Kirkland, WA (US); Masaaki Fukumoto, Beijing (CN); Johnny H. Lee, Sammamish, WA (US); Jordan Lee Kravitz, Seattle, WA (US); David William Baumert, Sammamish, WA (US)

(73) Assignee: Microsoft Technology licensing, LLC, Redmond, WA (US)

( * ) Notice: Subject to any disclaimer, the term of this patent is extended or adjusted under 35 U.S.C. 154(b) by 239 days.

(21) Appl. No.: 16/406,788

(22) Filed: May 8, 2019

(65) Prior Publication Data

US 2020/0357423 A1  Nov. 12, 2020

(51) Int. Cl.
| | | |
|---|---|---|
| *A01G 23/089* | (2006.01) | |
| *G10L 21/0208* | (2013.01) | |
| *B25J 9/16* | (2006.01) | |
| *B25J 11/00* | (2006.01) | |
| *B25J 19/02* | (2006.01) | |

(52) U.S. Cl.
CPC ......... *G10L 21/0208* (2013.01); *B25J 9/1602* (2013.01); *B25J 11/003* (2013.01); *B25J 11/0005* (2013.01); *B25J 19/026* (2013.01)

(58) Field of Classification Search
CPC ........... G10L 19/26; G10L 2021/02082; G10L 21/02; G10L 21/0208; G10L 15/22; G10L 19/018; G10L 21/0272; B25J 11/0005; B25J 9/1602; B25J 9/0003; H04R 1/406; H04R 2410/07; H04R 3/005; G06F 3/017; A61B 2017/00207; B60K 2370/146; B60K 2370/148; G06K 9/00389; G06K 9/00355
See application file for complete search history.

(56) References Cited

U.S. PATENT DOCUMENTS

| | | | |
|---|---|---|---|
| 8,995,671 B2 | 3/2015 | Nakadai et al. | |
| 2005/0018862 A1* | 1/2005 | Fisher | H04M 3/002 381/98 |
| 2008/0071540 A1 | 3/2008 | Nakano et al. | |
| 2010/0299145 A1 | 11/2010 | Nakadai et al. | |
| 2018/0190257 A1* | 7/2018 | Gharabegian | A45B 23/00 |
| 2019/0043520 A1* | 2/2019 | Kar | G10L 21/0272 |

(Continued)

OTHER PUBLICATIONS

Kraemer et al., Minstrel robots: Body language expression through applause evaluation, 2016, IEEE, p. 332-337 (Year: 2016).*

(Continued)

*Primary Examiner* — McDieunel Marc

(57) ABSTRACT

Noise reduction in a robot system includes the use of a gesture library that pairs noise profiles with gestures performed by the robot. A gesture to be performed by the robot is obtained, and the robot performs the gesture. The robot's performance of the gesture creates noise, and when a user speaks to the robot while the robot performs a gesture, incoming audio includes both user audio and robot noise. A noise profile associated with the gesture is retrieved from the gesture library and is applied to remove the robot noise from the incoming audio.

20 Claims, 5 Drawing Sheets

(56) References Cited

U.S. PATENT DOCUMENTS

2019/0385040 A1* 12/2019 Ikeuchi .................. G06N 3/008

OTHER PUBLICATIONS

Loper et al., Mobile human-robot teaming with environmental tolerance, 2012, IEEE, 157-163 (Year: 2012).*
Han et al., Collecting multi-modal data of human-robot interaction, 2011, EEE, p. 1-4 (Year: 2011).*
Brueckmann et al., Adaptive Noise Reduction and Voice Activity Detection for improved Verbal Human-Robot Interaction using Binaural Data, 2007, IEEE, p. 1782-1787 (Year: 2007).*
Hong et al., Multi-Channel Noise Reduction with Beamforming and Masking-based Wiener Filtering for Human-Robot Interface, 2011, IEEE, p. 260-264 (Year: 2011).*
Lee et al., Noisy Environment-Aware Speech Enhancement for Speech Recognition in Human-Robot Interaction Application, 2010, IEEE, p. 3938-3941 (Year: 2010).*
"International Search Report and Written Opinion Issued in PCT Application No. PCT/US20/023042", dated Jun. 17, 2020, 9 Pages.

* cited by examiner

NOISE REDUCTION IN ROBOT HUMAN COMMUNICATION

BACKGROUND

The present disclosure relates generally to robot-human communication, and more particularly, to noise reduction in robot human communication.

A robot is generally an electro-mechanical machine guided by a computer or electronic programming. Robots may be used in a wide variety of applications and are often thought of in the context of their use in industrial applications. Recently, the use of robots in the field of human-robot interaction has increased, and the quality of the human-robot interaction may be influenced by a number of factors, such as the ability of the robot to recognize utterances spoken by the user and the ability of the robot to interpret the utterance and response in an appropriate manner.

In order to provide a more natural communication environment for human-robot interaction, it may be desirable for the robot to provide a gesture along with a spoken utterance to realize a more natural communication process. The addition of a gesture to the robot's capabilities present additional challenges that can affect the robot system's ability to recognize utterances spoken by the user and to interpret the utterance appropriately.

It is with respect to these and other general considerations that embodiments have been described. Also, although relatively specific problems have been discussed, the embodiments should not be limited to solving the specific problems identified in the background.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

According to one aspect of the present disclosure a method for noise reduction in a robot system includes: obtaining a gesture to be performed by a robot; receiving incoming audio that includes audio from a user and robot noise caused by the robot's performance of a gesture; retrieving a noise profile associated with the gesture from a gesture library; and applying the noise profile to remove the robot noise from the incoming audio.

In embodiments, the gesture library comprises a plurality of predetermined gestures that the robot may be expected to perform. Each of the predetermined gestures is paired to a noise profile for removing robot noise in the event that incoming audio that includes user audio is received while the robot is performing the gesture.

According to another aspect, an apparatus for noise reduction in a robot system comprises a processor and a memory coupled to the processor and storing instructions for execution by the process. The instructions, when executed by the process cause the apparatus to: obtain a gesture to be performed by the robot; receive incoming audio that includes audio from a user and robot noise caused by the robot's performance of the gesture; retrieve a noise profile associated with the gesture from a gesture library, and apply the noise profile to remove the robot noise from the incoming audio.

Accordingly to another aspect, a computer readable medium comprises computer-executable instructions which, when executed by a computer, cause the computer to perform a method for noise reduction in a robot system in which a robot performs a gesture. The method comprises receiving an indication that the robot is performing the gesture; receiving incoming audio, the incoming audio including a user utterance mixed with mechanical robot noise caused by the robot's performance of the gesture; retrieving, from a gesture library comprising a plurality of predetermined gestures paired with noise profiles, a noise profile associated with the gesture; and applying the noise profile to the incoming audio to remove the mechanical robot noise caused by the robot's performance of the gesture.

BRIEF DESCRIPTION OF THE FIGURES (NON-LIMITING EMBODIMENTS OF THE DISCLOSURE)

Various embodiments in accordance with the present disclosure will be described with reference to the drawings, in which.

DETAILED DESCRIPTION OF EMBODIMENTS

In the following detailed description, reference is made to the accompanying drawings which form a part hereof, and in which are shown by way of illustration specific embodiments. These embodiments are described in sufficient detail to enable those skilled in the art to practice the technology. Other embodiments may be utilized and structural, logical and electrical changes may be made without departing from the spirit and scope of the disclosure. The following detailed description is therefore not to be taken in a limiting sense, and the scope is defined only by the appended claims and equivalents thereof. Like numbers in the figures refer to like components, which should be apparent from the context of use.

Figure 1:
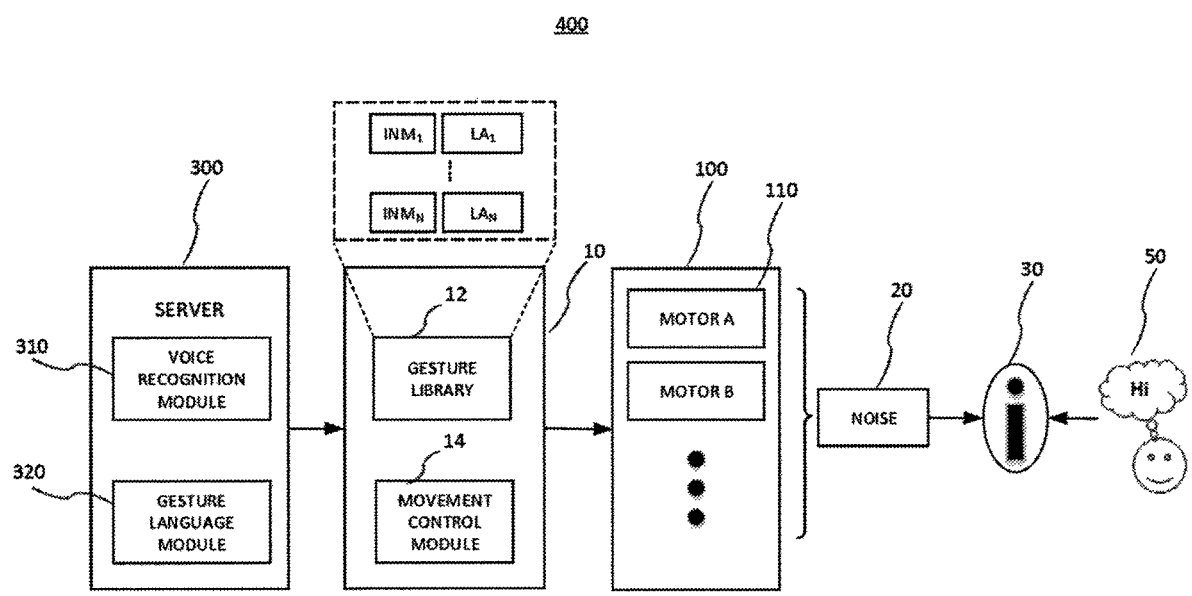
FIG. 1 is a schematic diagram illustrating a robot system in which example implementations of the subject matter described herein can be implemented.

FIG. 1 illustrates a schematic diagram of a robot system 400 according to embodiments of the present disclosure. As shown in FIG. 1, the robot system 400 generally includes a robot 100, an apparatus 10, and a server 300. The apparatus 10 may control the robot to perform various gestures by, for example, sending commands to the robot 100 to control motors/actuators 110 that orient the robot's 100 body parts in a particular manner.

In addition to performing gestures, the robot 100 may, for example, be a chatting robot whose gestures accompany utterances spoken by the robot 100 to provide a more natural, comprehensive and effective communication environment between the user 50 and the robot 100. During robot-human communication, the user 50 may interact with the robot 100 by delivering a message through speech/utterance or other expression. Incoming audio that includes the user's 50 utterance is received by the robot through a microphone 30, which may or may not be embedded within the robot 200. The server 300 may include a voice recognition module 310 for processing the user's utterance. The server 300 may be in the form of a cloud-based computer, for example, a chatting intelligence with voice recognition capabilities for the case of a chatting robot interacting with a user's 50 speech/utterance.

The apparatus 10 is capable of controlling the robot 100 to perform a predetermined number of different gestures. The apparatus 10 receives processed information from the server 300 and interprets the processed information to control the robot 100 to perform a particular gesture. The apparatus 10 includes a movement control module 14 that receives processed information from the server 300 and generates commands that control the robot 100 to move one or more robot body parts in a particular orientation to perform the gesture. The commands may, for example, be a series of joint angles that instruct the robot 100 how to orient its moving body parts.

The robot 100 receives the commands from the apparatus 10 and executes the commands to perform the gesture by operating a plurality of motors/actuators 110. The motors/actuators 110 orient the robot body parts in the manner instructed by the apparatus 100. In addition, the robot 100 may have movement control capabilities beyond those involved with performing a gesture from among the predetermined number of different gestures. For example, the robot 100 may have balancing capabilities in the event of unexpected movement that occurs during the performance of a gesture. This additional movement control capability may be accomplished through the movement control module 14 of the apparatus 10 or may be movement control performed independent of the apparatus 10 by the robot's 100 own internal movement system. The motors/actuators 110 (e.g., servo and/or stepper motors), transformers, chassis flex and contact, hydraulics, chamber echo inside the robot, gears, etc. involved in providing gestural, manipulation or loco-motion functions produce mechanical noise 20.

During the course of robot-human interaction, it is natural for a user 50 to wish to communicate with the robot 100 while the robot 100 is performing a gesture. For example, during a normal chatting process between the user 50 and the robot 100, the user 50 may first make expressions or ask questions to the robot 100, and then expect to receive a response. The robot's 100 response may include a gesture that is performed by the robot 100. While the robot 100 is performing this gesture, the user 50 may wish to speak to the robot 100 (e.g., to ask a follow up question). In order to realize a more natural and smooth communication process between the robot 100 and the user 50, the robot system 400 should be able to respond to an utterance from a user 50 that is issued while the robot 100 is performing the gesture. However, if the user 50 speaks while the robot 100 is performing a gesture, the incoming audio picked up by the microphone 30, which includes the user's utterance/speech signals, is mixed with the mechanical noise 20 caused by the robot's 100 performance of the gesture. The presence of the mechanical noise 20 in the incoming audio decreases the performance of the speech-recognition services provided by the voice recognition module 310 of the server 300, thereby decreasing the robot systems 400 ability to understand and respond to the user's utterance.

According to various embodiments of the present disclosure, the speech-recognition performance of a robot system 100 is improved by reducing the relative level of internal mechanical noise against the utterance/speech signals sensed by the microphone 30 of the robot, resulting in an increase in the signal-to-noise ratio with the audio content. Various embodiments of the present disclosure provide a gesture library in which the gestures that the robot 100 is expected to perform are paired with noise profiles. With knowledge of the gestures that the robot 100 can be commanded to perform, the corresponding noise profile can be retrieved and used to cancel out the mechanical noise components mixed with the user's 50 utterance.

Example implementations of the subject matter described herein will be described with reference to the robot system 400. However, the robot system 400 is described merely for the purpose of illustration without suggesting any limitations as to the scope of the subject matter described herein. For example, the ideas and principles are applicable to a stand-alone machine as well.

Figure 2:
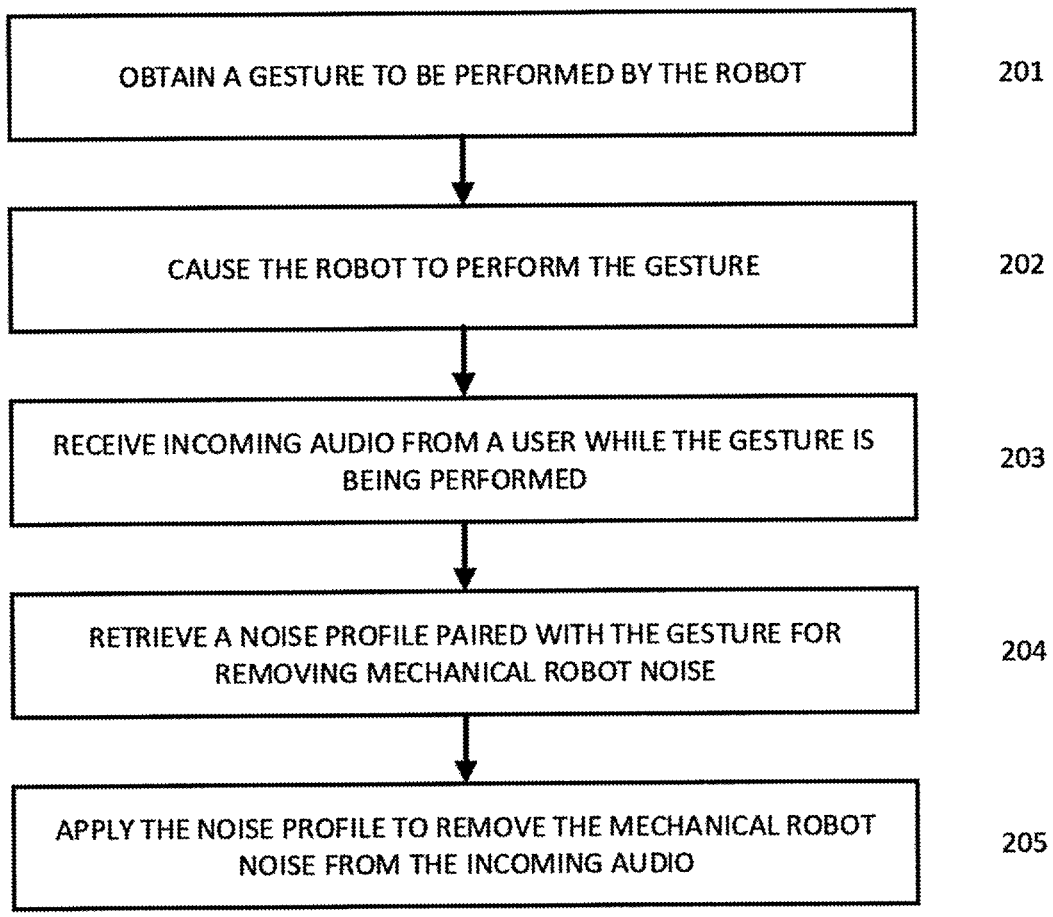
FIG. 2 illustrates a flow chart of a method for noise reduction in a robot system according to embodiments of the present disclosure.

FIG. 2 illustrates a flow chart of a method for noise reduction in a robot system 400 according to embodiments of the present disclosure. The method can be executed, for example, on the apparatus 10 as illustrated in FIG. 1. The apparatus 10 as shown can be a client device or a cloud-based apparatus, or it can be part of the server 300 or robot 100 illustrated in FIG. 1. The method may also include additional actions not shown and/or omit the illustrated steps. The scope of the subject matter described herein is not limited in this aspect.

The method will be described with reference to FIGS. 1 and 2. In 201, a gesture to be performed by the robot 100 is obtained. The gesture may be one of a plurality of predetermined gestures that the robot 100 is capable of performing. The gesture may, for example, be represented by a symbolic representation of the gesture. The symbolic representation may be a digital signal format in which the orientations of the body parts of the robot 100 are represented by symbols that can be interpreted by the apparatus 100 to generate instructions for the robot 100 to orient its body parts in a particular way.

In embodiments of the present disclosure, each of the gestures performed by the robot 100 may be represented using a gesture language in which symbols are used to represent orientations of robot body parts. The gesture language is preferable machine-independent (or hardware-independent), in that the language can be interpreted and compiled regardless of the type of robot 100 performing the gesture. The particular gesture to be performed by the robot 100 may, for example, be determined by the server 300 through the gesture language module 320. The server 300 may then provide the symbolic representation of the gesture to be performed by the robot 100 to the apparatus 10.

The server 300 may, for example, utilize a library that pairs a plurality of predetermined gestures that can be formed by a robot 100 with the symbolic representations of the gestures. The gesture language module 320 may thus determine an appropriate gesture to be performed by the robot 100 and send the symbolic representation of the gesture to the apparatus 10. However, the present disclosure is not limited in this manner. For example, the apparatus 10 itself may alternatively perform this function.

Figure 3A:
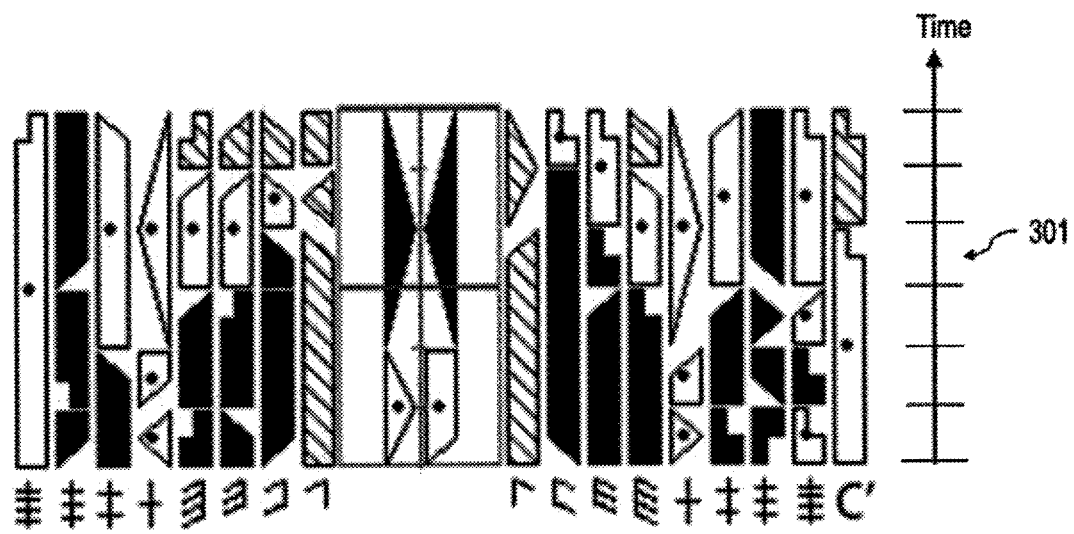
FIG. 3A illustrates a schematic diagram of a type of a symbolic representation of a gesture according to embodiments of the present disclosure.
Figure 3B:
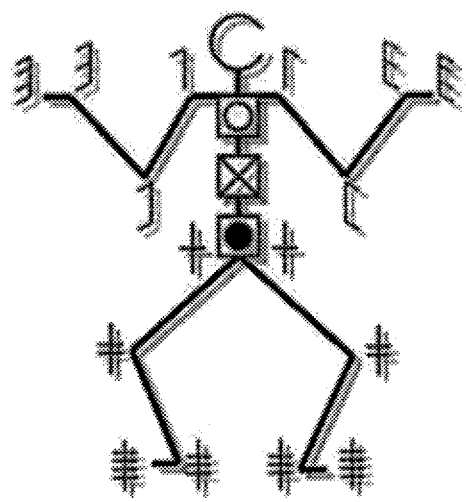
FIG. 3B illustrates example symbols of body parts of a robot.

One exemplary gesture language that may be utilized by the robot system 400 is Labanotation. FIGS. 3A and 3B illustrate a typical labanotation for performing a gesture.

Labanotation is a notation system used to record human movement in which symbols define orientations of various body parts. Labanotation herein particularly defines orientations of at least one body part of the robot 100 with respect to a plurality of time slots 301. Labanotation is machine-independent and thereby can be implemented by multiple different types of hardware (or robots). In addition, as a concise symbolic representation, it is easy to transmit labanotation between a robot and the cloud computer (e.g., the server 300) through limited communication channels. Labanotation also generally requires smaller memory than other types of representations.

In some embodiments, through a continuously captured/recorded gesture, orientations of the at least one body part of the robot 100 in the plurality of time slots 301 can be determined, and then symbols corresponding to the orientations can be obtained. After that, the symbols in association with the corresponding time slots 301 as a part of the labanotation can be saved.

In some embodiments, the at least one body part includes a plurality of body parts, and the labanotation includes a first dimension corresponding to the plurality of time slots 301 and a second dimension corresponding to the plurality of body parts. FIG. 3A illustrates such a labanotation representative of a particular gesture. In this labanotation, each of the columns corresponds to one specific body part, such as left hand, left arm, support, right arm, right hand, head. Each row corresponds to the time slot with a given duration. Further, a symbol represents to which direction that the body part is oriented at that time. It is noted that the sample labanotation in FIG. 3A is merely shown for purpose of illustration without suggesting any limitation as to the scope of the subject matter described herein. In other words, a more complicated labanotation with more body parts involved is also possible.

At 202, the apparatus 10 may cause the robot to perform the gesture. Once the apparatus 10 has obtained the gesture to be performed, the apparatus 10 instructs the robot 100 to orient its body parts to perform the particular gesture. For example, the apparatus 10 may receive a symbolic representation of the gesture from the server 300, and based on the symbolic representation, determine joint angles and instruct the robot 100 to control its motors 110 to a particular joint angle. The various motors 110 of the robot 100 move particular parts of the robot 100 so that the robot 100 performs the gesture.

Through the course of executing the instructions provided by the apparatus, the motors 110 and the mechanical parts of the robot 100 involved in providing the gesture produce mechanical noise 20 that can be picked up by the microphone 30. This noise 20 becomes problematic when, in 203 the microphone 30 receives incoming audio that includes user audio (for example, a user utterance) that the robot system 400 should interact with. In such a case, the incoming audio from the user may be audio on which speech recognition is performed in order for the robot system 400 to determine how it should response to the user's utterance. When the incoming audio is received while mechanical noise 20 is produced by the motors 110 and moving body parts of the robot 100, the mechanical noise 20 mixes with the incoming audio. The presence of the mechanical noise 20 in the incoming audio may decrease the performance of the speech-recognition services provided by the voice recognition module 310 of the server 300 that are used by the robot system 400 to understand and respond to the meaning of the user's utterance.

In order to reduce the mechanical robot noise 20 picked up by the microphone 30 and mixed with incoming audio, in 204, a noise profile $INM_N$ for removing the mechanical robot noise 20 from the incoming audio is retrieved. The noise profile is ultimately used to cancel out the mechanical noise 20 associated with the robot's 100 performance of the gesture when, in S205, the noise profile is applied. By canceling the mechanical noise 20 from the incoming audio, the signal-to-noise ratio of the incoming audio is improved, which enhances the voice recognition module's 310 ability to recognize, translate and effectively respond to the user utterance included in the incoming audio.

In embodiments of the present disclosure, the noise profile is retrieved from a gesture library 12, in which gestures ($LA_1$, $LA_2$, . . . , $LA_N$) are paired to noise profiles ($INM_1$, $INM_2$, . . . , $INM_N$). The gesture library 12 comprises a finite number of gestures that the robot 100 is expected to perform (namely, the plurality of predetermined gestures ($LA_1$, $LA_2$, . . . , $LA_N$)) for interacting with the user 50. For each of these gestures, the gesture library 12 includes a noise profile $INM_N$ for canceling out the mechanical noise 20 caused by the robot's 100 performance of the gesture $LA_N$. In applying 205 the noise profile $INM_N$ to remove mechanical noise 20 from the incoming audio picked up by the microphone 30, the noise signals associated with the performance of the gesture may, for example, be mixed out-of-phase with the incoming audio to obtain a cleaner audio signal that better represents the utterance that was spoken by the user 50 while the robot 100 performed the gesture.

In an embodiment in which the gesture is represented by a symbolic representation such as a labanotation $LA_N$, the gesture library 12 may index each of the noise profiles ($INM_1$, $INM_2$, . . . , $INM_N$) to the labanotation representative of the gesture that causes the noise 20 for which the noise profile $INM_N$ is created. In such a case, when server 300 provides a particular labanotation $LA_N$, the apparatus can pull the appropriate noise profile $INM_N$ from the gesture library 12 based on the labanotation $LA_N$ received from the server 300.

In an exemplary embodiment, each of the noise profiles ($INM_1$, $INM_2$, . . . , $INM_N$) may be an inverse noise model that can be mixed with the audio signals picked up by the microphone 30 in order to perform noise cancellation. An inverse noise model $INM_N$ is the inverse of the noise signals caused by the robot 100 when the robot performs the gesture associated with the inverse noise model $INM_N$. Thus, the inverse noise model may be mixed with the audio signals picked up by the microphone 30 during the robot's 100 performance of the gesture by adding the inverse noise model to the audio signals.

The sequence of steps described above are not limited to the particular order in which they are described and may be performed in any suitable order or simultaneously. For example, retrieval of the noise profile from the gesture library 12 may occur simultaneously with, before or after causing the robot to perform the gesture and receiving incoming audio from a user.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagated signal.

Figure 4:
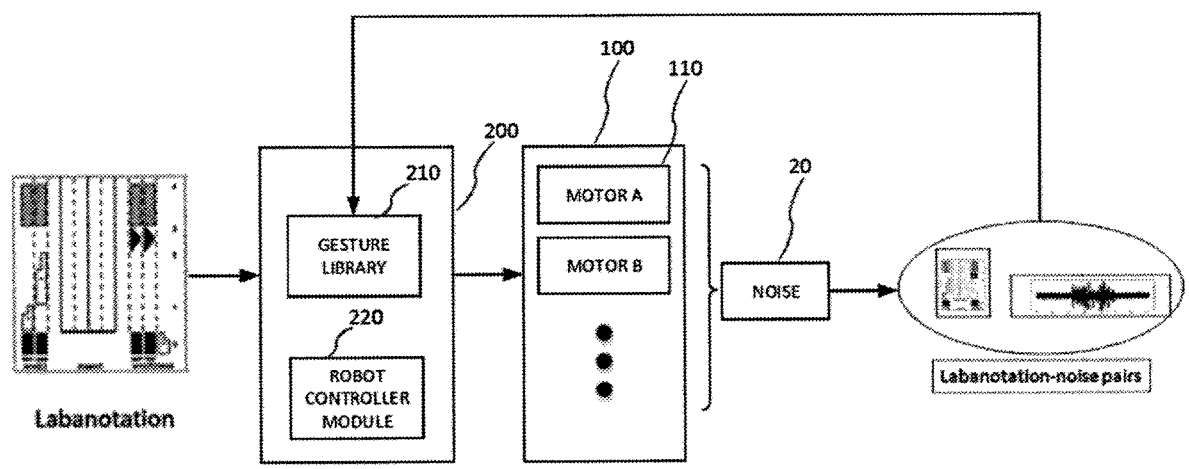
FIG. 4 is a schematic diagram illustrating the creation of gesture-noise profile pairs for a gesture library according to embodiments of the present disclosure.

FIG. 4 is a schematic diagram for illustrating the creation of gesture-noise profile pairs to be included in a gesture library 12 according to embodiments of the present disclosure. In the embodiment illustrated in FIG. 4, labanotation is used as a machine-independent gesture language for symbolically representing gestures performed by the robot 100. However, the gesture language used to create gesture-noise pairs is not limited to labanotation.

FIG. 4 illustrates an embodiment in which the mechanical noise 20 generated by a robot's 100 performance of a gesture is recorded in order to create a noise profile. In such a case, the gesture library 12 comprises noise profiles based on pre-recorded noise signals.

Upon obtaining a labanotation, the robot controller module 220 of the apparatus 100 controls the robot 100 to perform the gesture by, for example, sending instructions to the robot 100 to orient one or more robot body parts in a particular way. In performing the gesture, the robot 100 generates mechanical noise 20 caused by, for example, the robot's motors 110 (e.g., servo and/or stepper motors), transformers, chassis flex and contact, hydraulics, chamber echo inside the robot, gears, etc. The mechanical noise 20 is recorded, and a noise profile is created based on the pre-recorded noise 20. The created noise profile is then paired with the gesture (in this example, the labanotation representation of the gesture). The noise profile stored in the library 12 may, for example, be a digital recording of the pre-recorded noise signals, an inverse of the pre-recorded noise, or another noise profile created based on the pre-recorded noise.

As explained above, the noise profile will be used to cancel out mechanical robot noise that is picked up by microphone 30 and mixed with incoming user audio. In an exemplary embodiment, the noise profile may include pre-recorded noise signals that are mixed out-of-phase with the incoming user audio or an inverse of the pre-recorded noise signals that is added to the incoming user audio. The process of creating a gesture-noise pair is repeated for each of the gestures/labanotations contained in the gesture library 12. Because there is a finite number of the gestures/labanotations that the robot 100 is expected to perform, it is possible for the robot system 400 to provide a robot 100 that can perform a predetermined number of gestures using a gesture language that is independent of the robot 100 while also providing the ability to perform noise cancellation of noises that are specific to the particular hardware of the robot. Thus, the system 400 can ultimately provide gesture services to a plurality of different types of robots independent of the hardware and software implemented by the robot 100, while also having the ability to perform noise cancellation of noise that is specific to the motors, mechanical components, etc. of each of the different types of robots.

In an embodiment, the same microphone 30 that is used to capture incoming user audio is used to create the gesture library 12. Using the same microphone 30 can be beneficial in that the hardware components used to pre-record noise signals are the same as those that pick up the noise signals during operation of the robot system, thus further ensuring that the noise signals of the gesture library 12 are an accurate representation of the noise that will be picked up by the microphone 30 when the robot 200 performs the associated gesture.

In an embodiment, when creating the gesture library 12, the pre-recorded robot noise audio signals are synchronized with the corresponding gesture so that noise cancellation occurs at the appropriate time. As shown in FIG. 3A, when executing the labanotation, time passes from the bottom to the top in 301, and a specific combination of various symbols indicating the various orientations of multiple body parts at a given time slot 301 will be executed, so that the robot 100 can continuously perform the corresponding motion with respect to time. When building the gesture library 12 in accordance with the above described method, the robot 100 itself is used to generate the pre-recorded robot noise, and thus, the pre-recorded noise signals of the noise profile can be assumed to be synchronized with the particular movements of the robot at the time slots at which they occur. In order to synchronize incoming audio with the selected noise profile, the apparatus 10 may time stamp the point at which motor control begins and then synchronize this time stamp with the noise model associated with the gesture the robot is performing, so that the start point at which the microphone 30 receives incoming audio and the start point at which noise profile is applied are synchronized.

Although the embodiment described with respect to FIG. 4 illustrates an example in which the gesture library 12 is created based on pre-recorded noise signals picked up by the microphone 30, the creation of this gesture library 12 is not limited as such. For example, in an embodiment, the noise profile associated with a particular gesture may be obtained from an alternative source without requiring that the robot 100 itself record the mechanical noise 20. In addition, in another embodiment of the present invention, the noise profiles of the gestures in the gesture library 12 may be created using a physics model representative of the noise created by the robot when the robot performs a gesture. The physics model may predict the sound propagation occurring when the robot performs a gesture. Different from using data collected from sound sensors or the like (as in the case of creating noise-profiles using noise signals obtained from the microphone 30), the physics model encompasses predictions of motor waveforms, chassis sound emulation, sound reflection patterns, etc.

Embodiments of the present disclosure may also include an overlay model that can integrate unexpected sounds with the existing gesture library 12. The overlay model may, for example, be computed according to the physics model, or using extended noise records that may be generated in real-time. The unexpected sound from a received motor movement may, for example, be the result of the robot 100 righting itself or countering an external unexpected force that occurs while the robot 100 performs a gesture. The overlay model for the unexpected sounds may be applied along with the pre-recorded noise model for a particular gesture to facilitate additional noise cancelation in the event that additional unexpected movement occurs during a robot's performance of a gesture.

In addition, in embodiments of the present disclosure, an environment noise physics model may also be created to represent environmental noise that may picked up by the microphone 30 while the user 50 is interacting with the robot 100. The physics model for the environmental noise predicts the noise created by the environment in which the robot interacts. The physics model for environmental noise may be added to the gesture library 12 and may also be mixed out-of-phase with the incoming audio to reduce environmental noise picked up by microphone 30. The gesture library 12 may include a plurality of environmental models each modeling a different environment in which the robot may be present.

Once the noise model has been applied to the incoming audio signal in 205, the noise-cancelled audio signals may be transmitted to the voice recognition module 310. The voice recognition module 310 translates the noise-cancelled audio signals into verbal interaction elements used by and provided to the apparatus 10. For example, the voice recognition module 310 may perform analyses based on the content of the noise-canceled audio signals, and may prepare an utterance that is to be spoken by the robot 100 as a response to or an answer to the user utterance included in the noise-cancelled audio signals. Further, the gesture language module 320 may determine a gesture to be performed by a robot 100 based on the output of the voice recognition module 310. The gesture may accompany the utterance to be spoken by the robot 100, or, alternatively, the voice recognition module 310 may determine that an utterance will not be performed by the robot, and the gesture language module 320 may determine a gesture that will be performed by the robot 100 without an accompanying robot utterance.

In determining an appropriate gesture for the robot 100 to accompany a robot utterance, the server 300 may, for example, extract a concept from the utterance to be spoken by the robot and pull a gesture corresponding to the extracted concept from a library. The concept may be one representative extracted from a cluster of wards, and such concepts may include, for example, "Hello," "Good," "Thanks," "Hungry," etc. However, the present disclosure is not limited to any particular method of selecting a gesture that is to be performed by the robot 100.

Once a gesture is obtained, the robot system 400 may once again perform the method illustrated in FIG. 4 to remove robot noise from any incoming audio received by the microphone 30 while the gesture is performed.

Figure 5:
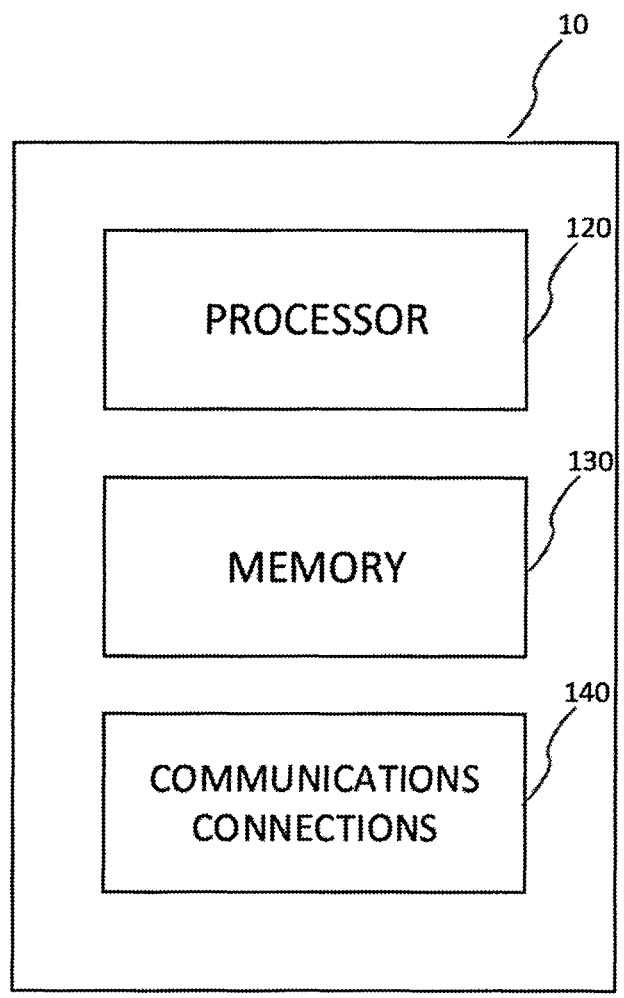
FIG. 5 is a high level illustration of exemplary components of a computing apparatus suitable for implementing noise reduction in a robot system according to embodiments of the present disclosure.

FIG. 5 is a block diagram of apparatus 10 suitable for implementing one or more implementations of the subject matter described herein. For example, the apparatus 10 may function as discussed above with reference to FIG. 1. However, the apparatus 10 is not intended to suggest any limitation as to scope of use or functionality of the subject matter described herein, as various implementations may be implemented in diverse general-purpose or special-purpose computing environments.

As shown, the apparatus 10 includes at least one processor 120 and a memory 140. The processor 120 executes computer-executable instructions and may be a real or a virtual processor. In a multi-processing system, multiple processors execute computer-executable instructions to increase processing power. The memory 130 may be volatile memory (e.g., registers, cache, RAM), non-volatile memory (e.g., ROM, EEPROM, flash memory), or some combination thereof. The memory 130 and its associated computer-readable media provide storage of data, data structure, computer-executable instructions, etc. for the apparatus 10.

In accordance with implementations of the subject matter described herein, the memory 130 is coupled to the processor 120 and stores instructions for execution by the processor 120. Those instructions, when executed by the processor 120 cause the apparatus to: obtain a gesture to be performed by a robot; receive incoming audio, the incoming audio including audio from a user with robot noise caused by the robot's performance of the gesture; retrieve, from a gesture library, a noise profile associated with the gesture for removing the robot noise caused by the robot's performance of the gesture from the incoming audio; and apply the noise profile to remove the robot noise from the incoming audio.

In the example shown in FIG. 5, the apparatus 10 further includes one or more communication connections 140. An interconnection mechanism, such as a bus, controller or network interconnects the components of the apparatus 10. Typically, operating system software provides an operating environment for other software executing in the apparatus 10, and coordinates activities of the components of the apparatus 10.

The communication connections 140 enable communication over a communication medium to another computing entity. Additionally, functionality of the components of the apparatus 10 may be implemented in a single computing machine or in multiple computing machines that are able to communicate over communication connections. Thus, the apparatus 10 may operate in a networked environment (for example, the robot system environment 400) using logical connections to one or more other servers, network PCs, or another common network node. By way of example, and not limitation, communication media include wired or wireless networking techniques.

Implementations of the subject matter described herein include a computer-readable medium comprising computer-executable instructions. Those instructions, when executed by a computer, cause the computer to perform a method for noise reduction in a robot system in which a robot performs a gesture, the method comprising: receiving an indication that the robot is performing the gesture; receiving incoming audio, the incoming audio including a user utterance mixed with mechanical robot noise caused by the robot's performance of the gesture; retrieving, from a gesture library comprising a plurality of predetermined gestures paired with noise profiles, a noise profile associated with the gesture; and applying the noise profile to the incoming audio to remove the mechanical robot noise caused by the robot's performance of the gesture.

Computer storage medium includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

The terminology used herein is for the purpose of describing particular embodiments only and is not intended to be limiting. As used herein, the singular forms "a", "an" and "the" are intended to include the plural forms as well, unless the context clearly indicates otherwise. The terms "comprises," "includes," "has," "comprising," "including" and/or "having," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. This description has been presented for purposes of illustration and description, but is not intended to be exhaustive or limiting in the form disclosed. Many modifications and variations will be apparent to those of ordinary skill in the art without departing from the scope and spirit of the technology. The embodiment was chosen and described in order to best explain the principles of the technology and the practical application, and to enable others of ordinary skill in the art to understand the technology for various embodiments with various modifications as are suited to the particular use contemplated.

Although specific embodiments have been described, those of skill in the art will understand that there are other embodiments that are equivalent to the described embodiments. Accordingly, the technology is not to be limited by the specific illustrated embodiments, but only by the scope of the appended claims.

According to one aspect of the present disclosure, a method for noise reduction in a robot system comprises: obtaining a gesture to be performed by a robot; receiving incoming audio, the incoming audio including audio from a user and robot noise caused by the robot's performance of the gesture; retrieving, from a gesture library, a noise profile associated with the gesture for removing the robot noise caused by the robot's performance of the gesture from the incoming audio; and applying the noise profile to remove the robot noise from the incoming audio.

In this aspect, the noise profile may be an inverse noise model, and applying the noise profile to remove the robot noise from the incoming audio may comprise applying the inverse noise model to the incoming audio.

In this aspect, the noise profile may comprise pre-recorded noise signals of the robot performing the gesture, and applying the noise profile to remove the robot noise may comprise mixing the pre-recorded noise signals out-of-phase with the incoming audio.

In this aspect, the gesture library may comprise a plurality of predetermined gestures performed by the robot, and each of the predetermined gestures is paired to a noise profile for removing robot noise.

In this aspect, the method may further comprise creating the gesture library, wherein creating the gesture library may comprise: causing the robot to perform the predetermined gestures; and recording, for each of the predetermined gestures, robot noise caused by the robot's performance of the gesture to create a noise profile.

In this aspect, the incoming audio may be received by a robot microphone, and recording, for each of the predetermined gestures, robot noise caused by the robot's performance of the gesture to create a noise profile may comprise recording, for each of the predetermined gestures, robot noise caused by the robot's performance of the gesture using the robot microphone.

In this aspect, the gesture library may comprise a plurality of symbolic representations of gestures to be performed by the robot and each of the symbolic representations is paired to a noise profile for removing robot noise.

In this aspect, obtaining a symbolic representation of a gesture to be performed by a robot may comprise obtaining a labanotation defining orientations of at least one body part of the robot with respect to a plurality of time slots.

In this aspect, the at least one body part includes a plurality of body parts, and causing the robot to perform the gesture may comprise executing the labanotation to trigger the plurality of body parts to perform the gesture according to the respective orientations in the plurality of time slots.

According to another aspect of the present invention, an apparatus for noise reduction in a robot system comprises a processor and a memory coupled to the processor and storing instructions for execution by the processor, the instructions, when executed by the processor, causing the apparatus to: obtain a gesture to be performed by a robot; receive incoming audio, the incoming audio including audio from a user and robot noise caused by the robot's performance of the gesture; retrieve, from a gesture library, a noise profile associated with the gesture for removing the robot noise caused by the robot's performance of the gesture from the incoming audio; and apply the noise profile to remove the robot noise from the incoming audio.

In this aspect, the noise profile may be an inverse noise model, and applying the noise profile to remove the robot noise from the incoming audio may comprise applying the inverse noise model to the incoming audio.

In this aspect, the noise profile comprises pre-recorded noise signals of the robot performing the gesture, and applying the noise profile to remove the robot noise may comprise mixing the pre-recorded noise signals out-of-phase with the incoming audio.

In this aspect, the gesture library may comprise a plurality of predetermined gestures performed by the robot, and each of the predetermined gestures is paired to a noise profile for removing robot noise.

In this aspect, the instructions, when executed by the processor, may further cause the apparatus to create the gesture library, wherein creating the gesture library comprises: causing the robot to perform the predetermined gestures; and recording, for each of the predetermined gestures, robot noise caused by the robot's performance of the gesture to create a noise profile.

In this aspect, the incoming audio may be received by a robot microphone; and recording, for each of the predetermined gestures, robot noise caused by the robot's performance of the gesture to create a noise profile may comprise recording, for each of the predetermined gestures, robot noise caused by the robot's performance of the gesture using the robot microphone.

In this aspect, obtaining a gesture to be performed by a robot may comprise obtaining a symbolic representation of the gesture to be performed by a robot, and the instructions, when executed by the processor, may further cause the apparatus to cause the robot to perform the gesture comprises controlling an orientation of at least one body part of the robot according to the symbolic representation.

In this aspect, the gesture library may comprise a plurality of symbolic representations of gestures to be performed by the robot and each of the symbolic representations is paired to a noise profile for removing robot noise.

In this aspect, obtaining a symbolic representation of a gesture to be performed by a robot may comprise obtaining a labanotation defining orientations of at least one body part of the robot with respect to a plurality of time slots.

In this aspect, the at least one body part may include a plurality of body parts, and causing the robot to perform the gesture may comprise executing the labanotation to trigger the plurality of body parts to perform the gesture according to the respective orientations in the plurality of time slots.

According to another aspect of the present invention, a computer-readable storage medium comprises computer-executable instructions which, when executed by a computer, cause the computer to perform a method for noise reduction in a robot system in which a robot performs a gesture, the method comprises: receiving an indication that the robot is performing the gesture; receiving incoming audio, the incoming audio including a user utterance mixed with mechanical robot noise caused by the robot's performance of the gesture; retrieving, from a gesture library comprising a plurality of predetermined gestures paired with noise profiles, a noise profile associated with the gesture; and applying the noise profile to the incoming audio to remove the mechanical robot noise caused by the robot's performance of the gesture.

In this aspect, the plurality of noise profiles of the gesture library may comprise pre-recorded noise signals of the robot performing the predefined gestures, and applying the noise profile to remove the robot noise may comprise mixing pre-recorded noise signals of the noise profile associated with the gesture out-of-phase with the incoming audio.

In this aspect, the plurality of predetermined gestures may be represented in the gesture library by a plurality of symbolic representations of the predetermined gestures, wherein a symbolic representation defines orientations of at least one body part of the robot in performing a gesture.

The invention claimed is:

1. A method for noise reduction in a robot system, the method comprising:
   obtaining a gesture to be performed by a robot;
   receiving incoming audio, the incoming audio including audio from a user and robot noise caused by the robot's performance of the gesture;
   retrieving, from a gesture library, a noise profile associated with the gesture for removing the robot noise caused by the robot's performance of the gesture from the incoming audio, wherein the noise profile is an inverse noise model, and applying the noise profile to remove the robot noise from the incoming audio comprises applying the inverse noise model to the incoming audio; and
   applying the noise profile to remove the robot noise from the incoming audio.

2. The method of claim 1, wherein the noise profile comprises pre-recorded noise signals of the robot performing the gesture, and applying the noise profile to remove the robot noise comprises mixing the pre-recorded noise signals out-of-phase with the incoming audio.

3. The method of claim 1, wherein the gesture library comprises a plurality of predetermined gestures performed by the robot, and each of the predetermined gestures is paired to a noise profile for removing robot noise.

4. The method of claim 3, further comprising creating the gesture library, wherein creating the gesture library comprises:
   causing the robot to perform the predetermined gestures; and
   recording, for each of the predetermined gestures, robot noise caused by the robot's performance of the gesture to create a noise profile.

5. The method of claim 4, wherein the incoming audio is received by a robot microphone, and recording, for each of the predetermined gestures, robot noise caused by the robot's performance of the gesture to create a noise profile comprises recording, for each of the predetermined gestures, robot noise caused by the robot's performance of the gesture using the robot microphone.

6. The method of claim 1, wherein:
   obtaining a gesture to be performed by the robot comprises obtaining a symbolic representation of the gesture to be performed by the robot, and
   the method further comprises causing the robot to perform the gesture, wherein causing the robot to perform the gesture comprises controlling an orientation of at least one body part of the robot according to the symbolic representation.

7. The method of claim 6, wherein the gesture library comprises a plurality of symbolic representations of gestures to be performed by the robot and each of the symbolic representations is paired to a noise profile for removing robot noise.

8. The method of claim 7, wherein obtaining a symbolic representation of a gesture to be performed by a robot comprises obtaining a labanotation defining orientations of at least one body part of the robot with respect to a plurality of time slots.

9. An apparatus for noise reduction in a robot system, comprising
   a processor;
   a memory coupled to the processor and storing instructions for execution by the processor, the instructions, when executed by the processor, causing the apparatus to:
      obtain a gesture to be performed by a robot;
      receive incoming audio, the incoming audio including audio from a user and robot noise caused by the robot's performance of the gesture;
      retrieve, from a gesture library, a noise profile associated with the gesture for removing the robot noise caused by the robot's performance of the gesture from the incoming audio, wherein the noise profile is an inverse noise model, and applying the noise profile to remove the robot noise from the incoming audio comprises applying the inverse noise model to the incoming audio; and
      apply the noise profile to remove the robot noise from the incoming audio.

10. The apparatus of claim 9, wherein the noise profile comprises pre-recorded noise signals of the robot performing the gesture, and applying the noise profile to remove the robot noise comprises mixing the pre-recorded noise signals out-of-phase with the incoming audio.

11. The apparatus of claim 9, wherein the gesture library comprises a plurality of predetermined gestures performed by the robot, and each of the predetermined gestures is paired to a noise profile for removing robot noise.

12. The apparatus of claim 11, wherein the instructions, when executed by the processor, further cause the apparatus to create the gesture library, wherein creating the gesture library comprises:
    causing the robot to perform the predetermined gestures; and
    recording, for each of the predetermined gestures, robot noise caused by the robot's performance of the gesture to create a noise profile.

13. The apparatus of claim 9, wherein:
    obtaining a gesture to be performed by a robot comprises obtaining a symbolic representation of the gesture to be performed by a robot, and
    the instructions, when executed by the processor, further cause the apparatus to cause the robot to perform the gesture comprises controlling an orientation of at least one body part of the robot according to the symbolic representation.

14. The apparatus of claim 13, wherein the gesture library comprises a plurality of symbolic representations of gestures to be performed by the robot and each of the symbolic representations is paired to a noise profile for removing robot noise.

15. The apparatus of claim 14, wherein obtaining a symbolic representation of a gesture to be performed by a robot comprises obtaining a labanotation defining orientations of at least one body part of the robot with respect to a plurality of time slots.

16. A computer-readable storage medium comprising computer-executable instructions which, when executed by a computer, cause the computer to perform a method for noise reduction in a robot system in which a robot performs a gesture, the method comprising:

receiving an indication that the robot is performing the gesture;

receiving incoming audio, the incoming audio including a user utterance mixed with mechanical robot noise caused by the robot's performance of the gesture;

retrieving, from a gesture library comprising a plurality of predetermined gestures paired with noise profiles, a noise profile associated with the gesture, wherein the noise profile is an inverse noise model, and applying the noise profile to remove the robot noise from the incoming audio comprises applying the inverse noise model to the incoming audio; and applying the noise profile to the incoming audio to remove the mechanical robot noise caused by the robot's performance of the gesture.

17. The computer-readable storage medium of claim 16, wherein the plurality of noise profiles of the gesture library comprise pre-recorded noise signals of the robot performing the predetermined gestures, and applying the noise profile to remove the robot noise comprises mixing pre-recorded noise signals of the noise profile associated with the gesture out-of-phase with the incoming audio.

18. The computer-readable storage medium of claim 16, wherein the plurality of predetermined gestures are represented in the gesture library by a plurality of symbolic representations of the predetermined gestures, wherein a symbolic representation defines an orientation of at least one body part of the robot in performing a gesture.

19. The computer-readable storage medium of claim 18, wherein the method further comprises:

obtaining a gesture to be performed by the robot comprises obtaining a symbolic representation of the gesture to be performed by the robot, and causing the robot to perform the gesture, wherein causing the robot to perform the gesture comprises controlling an orientation of at least one body part of the robot according to the symbolic representation.

20. The computer-readable storage medium of claim 16, wherein the noise profile comprises pre-recorded noise signals of the robot performing the gesture, and applying the noise profile to remove the robot noise comprises mixing the pre-recorded noise signals out-of-phase with the incoming audio.

* * * * *